Oct. 5, 1937.   F. W. BURGER   2,095,054
WHEEL
Original Filed Dec. 7, 1931   5 Sheets-Sheet 1

Fig. 1.

Inventor:
Frederick W. Burger
By Brown, Jackson, Boettcher, Dienner
Attys

Oct. 5, 1937.　　　　　F. W. BURGER　　　　　2,095,054

WHEEL

Original Filed Dec. 7, 1931　　5 Sheets-Sheet 2

Inventor:
Frederick W. Burger
By Brown Jackson Boettcher & Dienner
Attys.

Oct. 5, 1937.    F. W. BURGER    2,095,054
WHEEL
Original Filed Dec. 7, 1931    5 Sheets-Sheet 4

Inventor:
Frederick W. Burger
By Brown Jackson Boettcher Denner
attys.

Patented Oct. 5, 1937

2,095,054

UNITED STATES PATENT OFFICE 2,095,054

WHEEL

Frederick W. Burger, Niles, Mich., assignor to Clark Equipment Company, Buchanan, Mich., a corporation of Michigan Application December 7, 1931, Serial No. 579,405
Renewed July 30, 1936

14 Claims. (Cl. 301—6)

The present invention relates generally to wheels for automotive vehicles and the like.

The principal object of the present invention is to provide a wheel in which the brake drum and wheel body together form a rigid complete unit. More specifically, the present invention contemplates the provision of an integral wheel hub and brake drum upon which the wheel body or spider is mounted and rigidly secured thereto.

One of the prime requisites in automotive vehicle construction is the requirement for good brakes. Particularly is this true under modern traffic conditions. In the manufacture of wheels for automotive vehicles and the like it is generally customary to form the wheel body or spider, hub, and brake drum as separate elements and then, in the assembly of the wheel, to secure these parts together to form the complete wheel. In the use of this method it was very difficult to secure a completed wheel in which the various bearing and braking surfaces were accurately alined. It is, of course, obvious that safe and reliable brake operation is dependent upon having the braking surfaces, which are generally cylindrical, very accurately disposed with the axis thereof exactly coinciding with the axis of the bearings supporting the wheel. Naturally, where the brake drum is separately formed and is secured to the wheel by bolts or the like it is practically impossible to secure the brake drum in exactly the right position. Where, in accordance with the present invention, the hub and brake drum are formed integrally as one part and machining this part as a unit, the various machined surfaces will be exactly lined up and the central bearing bores will be very accurately located with respect to the braking surface. This is a distinct advantage and makes for a longer drum life as well as prolonging the life of the brake shoes and producing, in addition, a better operation and equality of action between the four brake drums of the car or truck.

Another object of the present invention is to form the integral brake drum and wheel hub as a cast iron member. It is generally recognized that a brake drum having a cast iron braking face is superior to drums formed of pressed steel or other metal and that braking conditions are very much improved and the life of the brake drum is superior where cast iron is used, especially where a special grade of electric furnace iron can be employed. The wheel body is preferably formed, as is common practice, of malleable iron or steel.

Forming the brake drum and wheel hub as an integral part eliminates the necessity of the several fits and production tolerances which are required where the brake drum is a separate machined part of the wheel.

Another principal feature of the present invention is the provision of an integral brake drum and wheel hub construction in which the wheel body or spider is so mounted thereon and secured thereto that driving stresses are transmitted from the drive shaft directly to the wheel body without being transmitted through the brake drum to any great extent. This is of particular importance in connection with full floating axles which is, as is well understood, a construction in which the wheel is separately journaled or mounted for rotation on the outer end of the stationary axle housing with the drive shaft connected with the wheel independently of the bearings supporting the wheel on the housing. The present invention as embodied in the preferred construction is particularly adapted for the full floating axle in that the integral wheel hub and brake drum can be mounted on the tubular axle housing and the driving connection be made directly with the wheel body mounted on the wheel hub.

In this type of construction the present invention has for its further object the provision of means for securing the wheel body on the wheel hub which also includes parts effective in securing the driving flange of the drive shaft to the wheel body. This construction makes for a simpler wheel in that certain parts perform a double duty in both securing the wheel parts together as a rigid unit and also transmitting the driving torque from the driving shaft directly to the wheel body.

Other objects and advantages of the present invention will be apparent to those skilled in the art after a consideration of the following detailed description of the preferred structural embodiment illustrated in the accompanying drawings in which.

Figure 1:
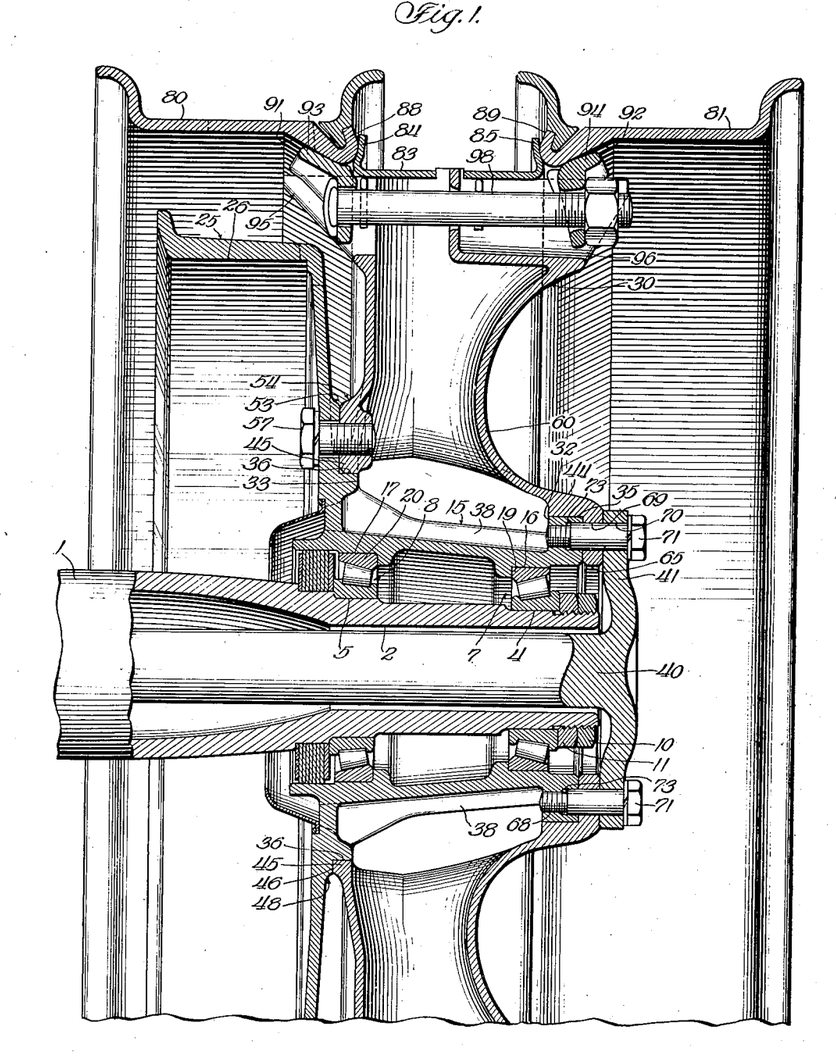
Figure 1 is a cross sectional view taken through a wheel and axle construction embodying a wheel body particularly adapted for mounting dual rims, and an integral wheel hub shell and brake drum rotatably mounted on the outer end of a tubular axle housing.
Figure 4:
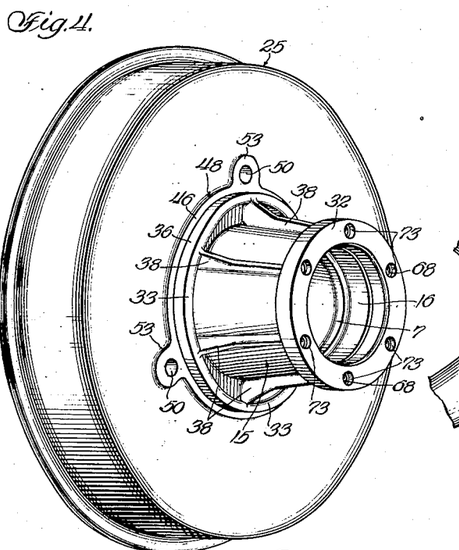
Figure 4 is a perspective view illustrating my improved integral brake drum and wheel hub shell construction.
Figure 5:
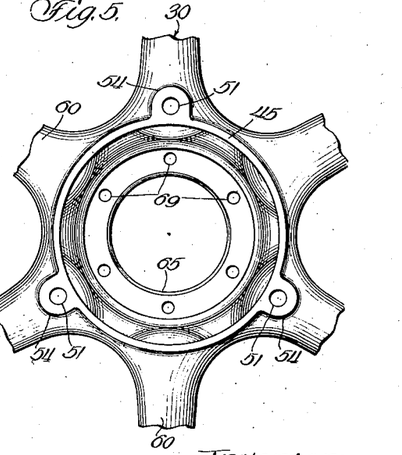
Figure 5 is a fragmentary view of the inside portion of the wheel body which fits against portions of the brake drum when the wheel is assembled as a rigid unit.

Referring now more particularly to Figures 1, 4, and 5, the reference numeral 1 indicates an axle tube or housing supporting its proportion of the weight of the car or other vehicle. The outer end 2 of the axle housing is reduced and is provided with seats 4 and 5 to receive, respectively, the inner races of the outer and inner bearings 7 and 8. The outermost end of the axle housing 1 is threaded and receives a pair of lock nuts 10 and 11 by which the bearings 7 and 8 are adjusted.

A wheel hub shell 15 is rotatably mounted on the end of the axle housing 1 by means of the bearings 7 and 8, and the hub shell 15 is provided with laterally outer and inner bearing bores 16 and 17 to receive, respectively, the outer races 19 and 20 of the bearings 7 and 8.

A brake drum 25, having an interior cylindrical braking surface 26 joined to the hub member 15 by a web or head in the form of a diaphragm serving as a backing plate, is formed integrally with the wheel hub shell 15. The brake drum 25 is flanged, as best shown in Figure 1, so as to provide a substantially uninterrupted Z-section, thereby materially increasing the strength of the brake drum against braking stresses. Preferably the wheel hub 15 and brake drum 25 are formed of cast iron, electric furnace iron being generally the most satisfactory material. As pointed out above, where the brake drum and wheel hub shell are integrally formed the bearing bores 16 and 17 and the braking surface 26 can be very accurately machined so that these portions will be accurately located and lined up, not only when the wheel is new but also these portions will retain their correct relative positions during the entire life of the wheel.

The wheel body or spider 30 is preferably formed separately of the wheel hub shell and brake drum member. This wheel body or spider 30 is formed preferably of malleable iron or steel, whereas as above stated the brake drum and bearing shell member 15 is formed of cast iron. Thus the parts are formed of materials which are well adapted for the specific service in the organization of which they are a part. In order to mount the wheel body or spider 30 on the wheel hub shell 15 the latter is provided with flanges 32 and 33 adjacent the ends of the hub. Flange 32 is disposed adjacent the laterally outer end of the hub shell 15 and is somewhat smaller in diameter than the laterally inner flange 33 which is disposed at the other end of the hub shell at the junction between the integral hub member 15 and the brake drum member 25. These flanges 32 and 33 provide radially outwardly facing seats or shoulders 35 and 36 upon which the corresponding portions of the wheel body or spider 30 are received. The wheel hub shell 15 is provided with a number of radial fins or reenforcing webs 38 to strengthen the construction and to connect the flanges 32 and 33.

The wheel body 30 is adapted to be seated on the shoulders or seats 35 and 36 in the manner best shown in Figure 1. For this purpose the central portion of the spider or wheel body is formed with a central hub section having a pair of laterally spaced radially inwardly directed flanges 44 and 45 of continuous ring-like formation providing inwardly facing shoulders formed to engage with the flanges 32 and 33. These abutting or interengaging surfaces are preferably accurately machined so as to correctly fit and thus accurately center the wheel body on the hub, and they are spaced apart axially a sufficient distance to adequately take care of all lateral stresses to which the wheel body is subjected. Also, since the wheel body seating flanges 44 and 45 are continuous ring-like portions, the hoop strength thereof serves at all times to hold the wheel body in proper position on the hub member while preventing radial and lateral loads from distorting the wheel body where it seats on the hub member.

The inner flange 45 is formed in the nature of a thickened section on the laterally inner side of the wheel body, and this section has a substantially planar inner face to fit against a similarly formed face 46 on the hub and brake drum disposed substantially at the junction between the inner portion of the brake drum member and the hub member just outside the flange 36 upon which the flange 45 seats, this portion of the integral hub and brake drum member being rigidly tied in with the cylindrical portion of the hub section 15 by the radial fins 38. At the face 46 the brake drum 25 is formed in a thickened portion, as indicated by the reference numeral 48 in Figure 1. At spaced points the thickened section on the wheel body and the thickened portion on the brake drum are apertured, as at 50 and 51, and around these apertures the thickened sections are extended, as at 53 and 54, to provide for ample material at these points to take care of driving and braking strains and stresses. The openings 51 in the wheel body 30 are preferably threaded to receive cap screws 57 which pass through the openings 50 in the brake drum adjacent the flange 33 and into the openings 51. When these cap screws 57 are tightened the wheel body 30 is clamped against the brake drum on the wheel hub with the faces 45 and 46 in abutting engagement, but the attaching means 57, being disposed practically as close as possible to the hub section 15, not only serves to hold the wheel body on the integral brake drum and the hub member but, in addition, performs this function in a manner which relieves the brake drum of practically all stresses arising by virtue of radial and lateral thrusts to which the wheel body is subjected, these forces being transmitted directly to the hub section 15 without going through any portion of the brake drum member.

Figure 2:
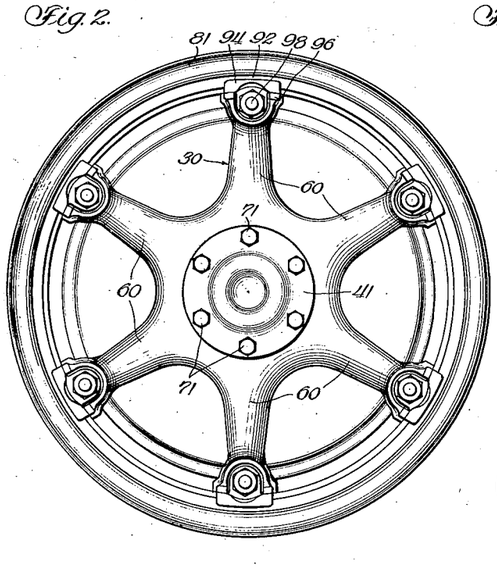
Figure 2 is a side elevation, somewhat on a reduced scale, showing the completed wheel unit.
Figure 3:
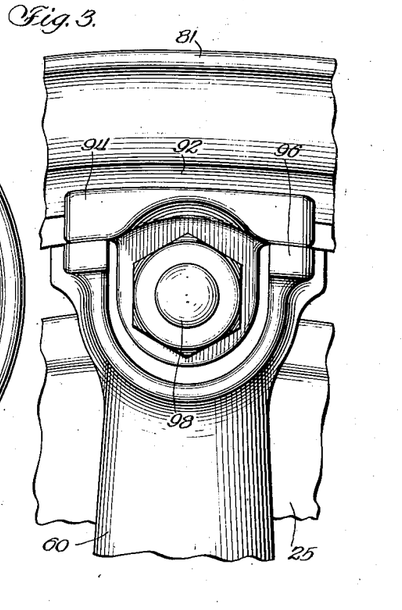
Figure 3 is an enlarged fragmentary view illustrating one means for securing the tire rims on the peripheral portion of the wheel body.
Figure 11:
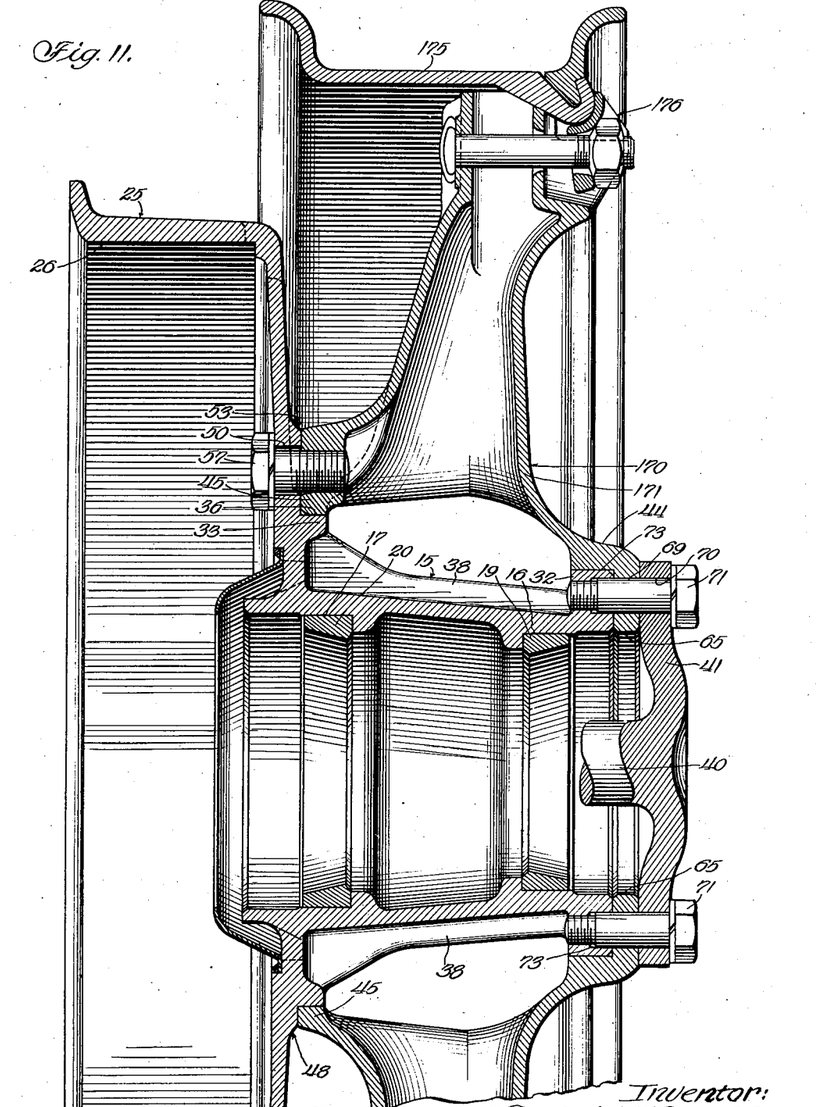
Figure 11 is a view similar to that shown in Figure 1 but illustrating a slightly different form of wheel body particularly adapted to receive a single tire carrying rim.

The wheel body or spider 30 may take any convenient form but, as illustrated, the wheel body comprises a hollow thin walled casting having a plurality of radially extending interconnected hollow spokes 60, see Figures 2, 3 and 5. The walls of the hollow spokes merge together at the inner ends of the spokes to form outwardly arched walls between the spokes. These arched walls provide a hub of maximum rigidity and serve to distribute the stresses upon the individual spokes over an extensive part of the hub and to the rings 44, 45. The laterally outer portion of the wheel body 30 is formed with a central radially inwardly projecting flange 65 which lies laterally outwardly of the seat or shoulder 35 but which is so disposed as to lie against the flange 32 when assembled on the wheel hub, as best shown in Figures 1 and 11. This radially inwardly extending flange 65 is arranged to lie between the driving flange 41 and the radially outwardly extending flange 32 on the wheel hub. The flange 32 is provided with a plurality of threaded apertures 68 while the flanges 41 and 65 are provided with registering openings 69 and 70. Stud bolts 71 are arranged to pass through the openings 69 and 70 and into the threaded openings 68 in the flange 32. The stud bolts 71 are cylindrical for a greater part of their length and the cylindrical portion of each of these bolts is of slightly greater diameter than the threaded end, as best illustrated in Figures 1 and 11. The cylindrical portion of each of these studs is received by the openings 69 and 70 and extends partly into the corresponding opening in the flange 32. For this purpose the latter is formed with a counterbore 73 to accommodate the innermost end of the cylindrical portion of the stud 71. Thus, when the stud bolts 71 are tightened the wheel body or spider 30 is securely clamped to the uppermost end of the wheel hub by means which not only acts as securing means but also is effective in transmitting driving torque directly from the drive shaft 40 to the wheel body itself.

This is an important feature, particularly in connection with axles of the full floating type. From Figures 1, 4 and 5 it will be observed that the integral steel hub and brake drum member and the wheel body are held in firm relationship by the three cap screws 57 which pass through the openings 50 and 51. After the entire wheel assembly is mounted on the axle tube and the bearings 7 and 8 properly adjusted, the drive flange stud bolts 71 are inserted through the openings 69 and 70 and threaded into the openings 68, thus further securing the wheel body and the hub together. In ordinary constructions the separate brake drum is fastened to the wheel with six cap screws, but in the illustrated construction there are actually nine studs rigidly securing the wheel body and the brake drum together. This makes for a very rigid construction and one which is secured by comparatively few parts. As stated above the driving torque is transmitted directly to the wheel body by virtue of the stud bolts 71 transmitting the torque directly from the flange 41 to the wheel body. The greater part of the entire driving torque is thus transmitted, but because the two flanges 65 and 41 are rigidly connected with the hub member 15 a certain portion of the driving torque is transmitted through the hub 15 and the brake drum 26 to the cap screws 57 and thence to the wheel body. It is also important to note that by virtue of the three cap screws 57 braking stresses are transmitted directly from the brake drum 25 to the wheel body without going through the hub 15. Of course, for the reasons just pointed out a certain portion of the braking stresses are transmitted through the studs 71 to the laterally outer portion of the wheel body 30. The important practical advantage of this construction resides in this, namely, that inasmuch as the braking torque is transmitted through the cap screws 57 from the brake arm directly to the hub of the wheel body and the driving torque is transmitted through the cap screws 71 directly to the other end of the hub of the wheel body, the effects of reversals of torque upon the composite wheel, as by braking and driving, are minimized. The cap screws 57 are not subjected to reversal of forces, as they are intended to take substantially only the braking torque. Thus they do not tend to become loose. Likewise, the surfaces 36 and 73 are saved from wear by reversals of torque between the member 15 and the wheel spider 30.

The wheel body 30 is a free spoke end member. This means that the spokes are cantilevers anchored only at the hub until the rim is clamped to such spoke ends. In the operation of clamping the rim or rims to the spoke ends, it may sometimes occur that one spoke is stressed axially of the wheel considerably more than another. According to my present invention, this does not adversely affect the concentricity of trueness of the brake drum. The strength and resistance of the spider hub is such that an individual spoke may be bent without any appreciable effect on the brake drum. This is a highly important practical consideration.

The wheel body 30 carries two tire rims 80 and 81 at its periphery, the two rims being spaced by a suitable spacing ring 83, seated or centered on the outer circumference of the wheel body and provided with flanges 84 and 85 adapted to abut the adjacent marginal gutters 88 and 89. These last named portions provide tapered wedge surfaces 91 and 92 with which rim lugs 93 and 94 are adapted to engage. The rim lugs 93 and 94 are mounted on shoulders 95 and 96 forming a part of the wheel body. The lugs 93 and 94 are clamped by means of a clamping bolt 98. This means for securing the rims 80 and 81 on the wheel body is substantially the same as that disclosed in my copending application, Serial No. 503,433, filed December 19, 1930, to which reference may be had for specific details.

Figures 6 to 10 inclusive, illustrate the application of the principles of the present invention to a front wheel construction. In these figures the reference number 100 indicates a steering spindle upon which the front wheel is journaled by anti-friction bearings of any suitable form, the outer bearing being indicated by the reference numeral 101. These bearings are adjusted by an adjusting nut 102 in the usual manner. The hub is indicated in its entirety by the reference numeral 105. This hub is provided with a cylindrical seating surface 106 and a radially outwardly extending flange 107 providing an outwardly facing seat or shoulder 108, the surfaces 106 and 108 being of unequal diameter and spaced apart laterally to receive the wheel body 110.

Formed integrally with the hub 105 is a brake drum 115 having an interior cylindrical brake surface 116. As in the case of the structure illustrated in Figure 1, the integral wheel hub shell and brake drum are preferably formed of cast metal, electric furnace iron being the preferred material. The section of the brake drum lying adjacent the radially outwardly extending flange 107 is thickened, as indicated by the reference numeral 118. This thickened portion 118 is provided with a number of apertures 120 through which passes the securing means for holding the wheel body 110 on the hub 105. The hub 105 is also provided with a number of reenforcing fins or webs 121.

Figure 6:
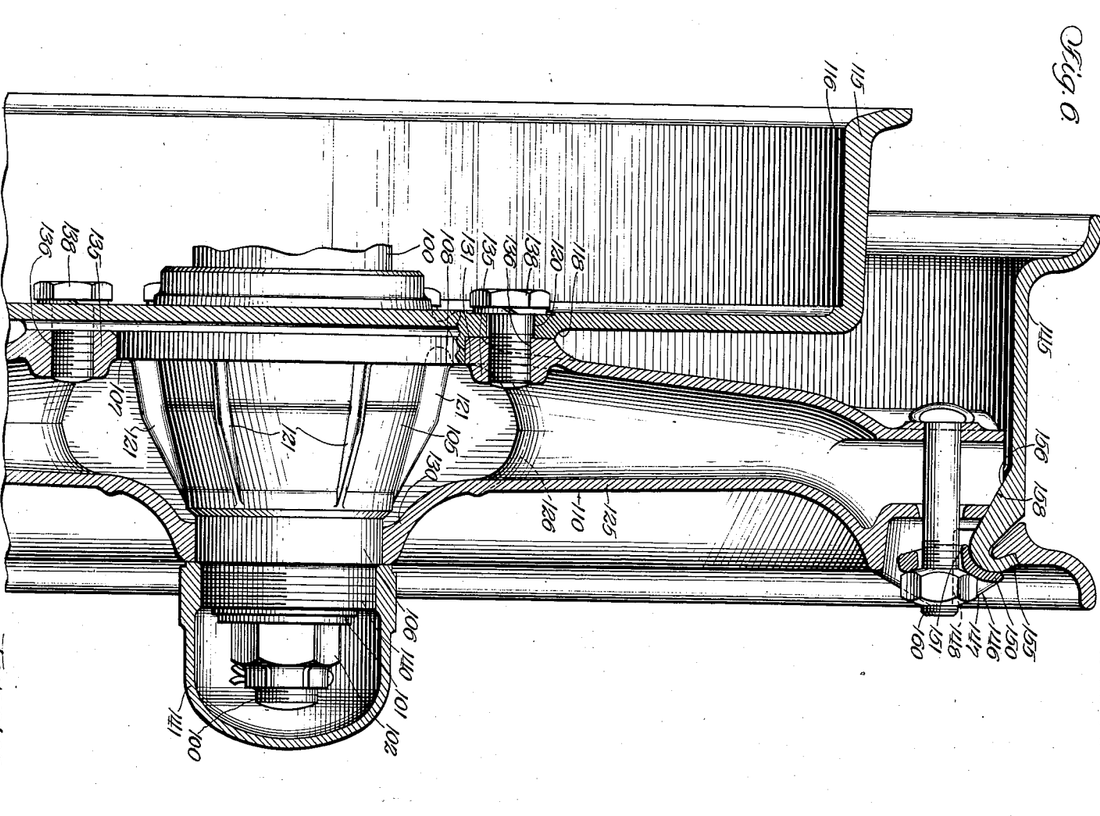
Figure 6 is a cross sectional view illustrating the principles of the present invention as embodied in a front wheel or any wheel which is not a drive wheel.
Figure 7:
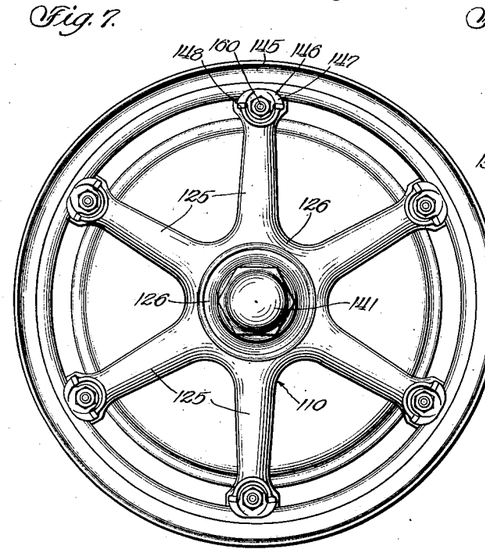
Figure 7 is a side elevation at a reduced scale of the wheel shown in Figure 6.
Figure 8:
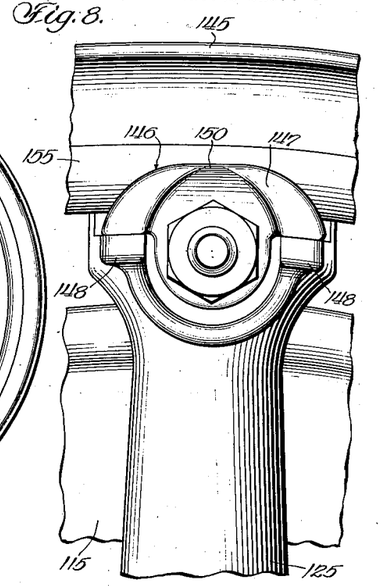
Figure 8 is an enlarged fragmentary elevation illustrating the means for securing the tire carrying rim on the wheel shown in Figures 6 and 7.
Figure 9:
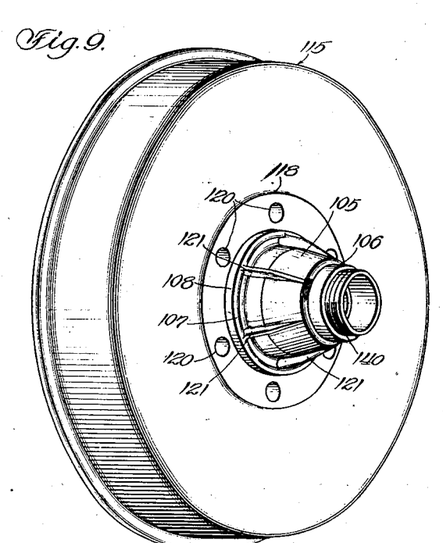
Figure 9 is a perspective view illustrating the integral brake drum and wheel hub shell construction particularly adapted for the wheel shown in Figure 6.
Figure 10:
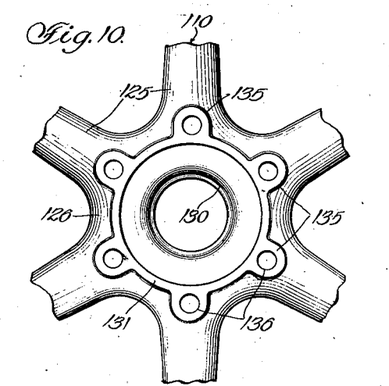
Figure 10 is an inside view of the wheel body showing the face or surface which is received against the brake drum when the wheel is assembled.

The wheel body 110 is preferably comprised of a plurality of radially extending spokes 125 joined by a central connecting portion 126. This central portion of the wheel body 110 is provided with a pair of radially inwardly extending flange portions 130 and 131 spaced apart laterally and of a diameter to cooperate, respectively, with the seating surfaces 106 and 108 of the wheel hub 105. The laterally inner flange portion 131 of the wheel body is thickened and is provided with a number of apertured bosses 135 having threaded holes 136 to receive cap screws 138. Preferably, there are six openings 120 in the brake drum and six apertures 136 in the wheel body. As best illustrated in Figure 6, the six cap screws 138 pass through the openings 120 and are threadedly received by the bosses 135. When the cap screws 138 are securely tightened the wheel body 110 is securely attached to the brake drum and hub structure, thereby forming a rigid wheel unit. As in the case of the wheel illustrated in Figure 1, the abutting surfaces formed, respectively, on the brake drum and on the wheel body are planar so that the two parts of the wheel may be rigidly connected together. The laterally outer end of the hub 105 is provided with a reduced threaded end 140 whereby a hub cap 141 may be screwed thereon to enclose and protect the outer end of the spindle 100.

The radially outer ends of the spokes 125, that is, the outer periphery of the wheel body 110, carry a tire rim 145 securely clamped thereto by lug means 146. Preferably this lug means takes the form of a lug 147 slidably mounted on shoulders 148 provided at the radially outer ends of the spokes 125. The lug 147 includes a rim engaging portion 150 and a second portion 151 adapted to preliminarily aline the tire carrying rim 145. The latter is provided with the usual marginal gutter 155 which includes a tapered inner surface 156. The radially outer ends of the spokes 125 have a wedge surface 158 cooperating with the tapered surface 156 on the rim 145 whereby when the lug means 146 is tightened, as by the bolt and nut 160, the rim is securely mounted on the wheel body 110.

By the above reference to the integrality of the present construction, it is not to be understood that the present invention is to be limited to a single metallic one piece casting. By integrality is meant a mechanically continuous and permanent connection of a uniform and homogenous nature, establishing, by such characteristics, an invariable relation as between the different sections involved whereby accuracy of manufacture, never before achieved, can be obtained. Such sections or portions may, as in the present invention, actually be functionally separate sections.

It will be observed that the wheel body or spider 110 is held in place on the hub 105 by means of six cap screws. The number of these may, of course, vary. Preferably, however, the number of cap screws associated with the brake drum 115 in Figure 6 is somewhat greater than the number of cap screws passing through the brake drum 25 in the construction illustrated in Figures 1 and 4. This difference arises because the wheel illustrated in Figure 6 is a front wheel and is not, ordinarily, a driving wheel; hence all braking stresses are preferably carried through to the brake drum without going through the hub 105. It is, of course, within the scope of the present invention to provide securing means for clamping the laterally outer portion of the wheel body 110 to the laterally outer end of the hub 105, as in the case of the driving wheel shown in Figure 1. This construction would be the preferred one in case the front wheels are drive wheels. Where the front wheel is not a drive wheel, however, the construction illustrated in Figure 6 is preferred.

Figure 11 is a modification of the form of wheel illustrated in Figure 1 and shows the application of the present invention to a drive wheel, particularly for full floating axles, in which only one tire carrying rim is used. In this form the brake drum 25 and wheel hub 15 are identical with the construction illustrated in Figure 1. The same is also true of the means for rotatably supporting the wheel hub and for driving the same, hence the same reference numerals have been used on like parts.

In Figure 11, the wheel body 170 is provided with laterally spaced flanges 44 and 45 which are adapted to seat on the flanges 32 and 33 on the wheel hub 15. In Figure 11, however, the spokes 171 are disposed somewhat laterally outwardly as compared with the spokes 60 in Figure 1, and the ends of the spokes 171 are formed in substantially the same manner as is illustrated in Figure 6 whereby the wheel is designed for carrying a single tire rim 175. The lug means 176 holding the rim 175 in place on the wheel body 170 is identical with the lug shown in Figure 6 and hence it need not be described further. The lug means shown in both Figures 6 and 11 is quite similar to that disclosed and claimed in my copending application Serial No. 504,714, filed December 26, 1930.

While I have shown and described the preferred structure, it will be apparent that various departures may be made from the structure illustrated. My present invention is, therefore, not to be limited to the specific means shown and described but, in fact, widely different means may be employed in the practice of the broader aspects of my invention, as defined by the appended claims.

What I claim, therefore, and desire to secure by Letters Patent is:

1. In a device of the class described, the combination of a brake drum and bearing shell member having a bearing shell provided with internal seats for anti-friction bearings and with external cylindrical seats for receiving a wheel body, said member having a rigid cast iron brake drum and drum head disposed at and permanently fixed to the inner end of the bearing shell, a hollow cast metal wheel body having rigid spokes and having an outwardly arched hollow hub, the ends of the hub constituting rings seated upon said cylindrical seats on the bearing shell, cap screws extending through the drum head into the inner ring to hold the parts against axial displacement and to pin the wheel body and the brake drum together for braking torque at this point of connection, and wheel driving means connected directly to the outer ring of the hub of the wheel body for transmitting driving torque directly to the wheel body, whereby the driving torque and braking torque do not reverse the stresses upon said cap screws.

2. A wheel comprising a cast iron tubular hub shell having an integral internal brake drum the head of which merges into the inner end of the hub shell, said hub shell having internally disposed bearing seats for anti-friction bearings one adjacent each end, and having externally disposed substantially cylindrical wheel seats spaced axially substantially the full free length of the hub shell, the inner seat being of a diameter larger than that of the outer seat, said seats being of relatively short axial length, the inner seat being disposed substantially at the junction of the brake drum head and the hub shell, a hollow thin walled cast wheel body comprising hollow rigid spokes and a hollow hub having two integral bearing rings spaced apart substantially the full axial length of the hub and gripping said wheel seats, clamping screws extending through the brake drum head substantially at said inner seat and being coupled to the inner ring and serving both to pin the hub shell and wheel hub together and to safeguard against axial displacement of the wheel body with respect to the hub shell.

3. The wheel of claim 2 wherein the wheel body has free spoke ends adapted for mounting a rim, the walls of said spokes at their inner ends merging into each other and merging into said rings, the junction of the walls of the inner ends of the spokes constituting arches joining the said rings and being highly resistant to distortion by cantilever loads on the spokes, the radial and axial loads on the individual spokes being transmitted to the wheel hub and being there distributed and transmitted through said rings to said seats.

4. In combination with the wheel of claim 2 wherein the outer hub ring has an integral flange extending radially inwardly and seating flat against the outer end of the hub shell, of a drive spindle having a head comprising a disc, the margin of which lies flat against said flange, and screws extending through said disc and flange and clamping them to the outer end of the hub shell, whereby the torque of the spindle is transmitted directly to the wheel body.

5. The combination with the wheel of claim 2, wherein the outer hub ring has an integral drive connecting portion lying axially outside the outer seat, of a drive spindle having a head connected directly to said portion for transmitting torque directly between the spindle and wheel body.

6. A wheel member comprising a cast iron tubular hub shell comprising a relatively thin tubular wall and having internally disposed coaxial anti-friction bearing seats one adjacent each end, a pair of relatively thin integral flanges extending radially outwardly from each end of the tubular wall, the outer flange being relatively short radially and having a cylindrical periphery forming a wheel seat, the inner flange extending outwardly radially further than the outer flange, said inner flange having an integral brake drum head formed integrally as a continuation thereof, and said head having an axially extending integral cylindrical flange forming an internal brake drum finished accurately coaxially and concentrically with said internal bearing seats, said brake drum head having a plurality of apertures arranged in circumferentially spaced relation, the surfaces about said apertures being finished to lie substantially in a plane at right angles to the axis of the hub shell, an axially extending offset thickened portion on said inner flange intermediate the ends thereof and finished to provide a continuous external cylindrical seating surface disposed radially inwardly of said apertures and axially outwardly of said finished surfaces, and a series of longitudinally extending flanges integral with the walls of the hub shell and said inner radially extending flange to reinforce the shell and brace the said inner flange against the wall of the shell.

7. A wheel spider comprising a hollow cast metal hub and spoke structure comprising tubular free end spokes, the walls of which spokes merge together at the inner ends of the spokes to form a hollow hub, the walls of the hub being formed into two concentric rings, one at each end of the hub, said rings providing hoop strength for the ends of the hub, and also providing spaced continuous cylindrical supporting surfaces for the unbalanced radial and axial loads upon the wheel spider, said walls of the hub between the rings and intermediate the spokes being arched outwardly to provide maximum rigidity and to distribute the stresses imposed upon the individual spokes over an extensive part of the hub and to the said rings, said outer ring having a radially inwardly extending flange and being adapted to extend over a corresponding flange on a hub member, said radial flange being apertured to receive bolt means clamping the same between said hub flange and the flange of a drive spindle.

8. A wheel member comprising a cast iron tubular hub shell comprising a relatively thin tubular wall and having internally disposed anti-friction bearing seats, one adjacent each end, an integral radial flange at the outer end of said shell, a second integral radial flange at the inner end of said shell terminating in a cylindrical brake drum flange finished accurately coaxially and concentrically with said bearing seats, an annular offset shoulder extending outwardly from said second radial flange intermediate said shell and drum, said shoulder having a finished cylindrical external surface cooperating with a finished radial surface on said second flange to form a seat for a wheel spider, and a finished cylindrical external surface on said first radial flange forming a second seat for said wheel spider.

9. In combination, a wheel hub having a brake drum supporting portion at its inboard side, annular seating means on said hub, a wheel spider having means engaging said seating means to mount said spider concentrically on said hub, means directly connecting said spider to said brake drum supporting portion to transmit the braking reaction directly to said spider radially outwardly of said hub portion, and a driving spindle extending through said hub and connected directly to said spider outwardly of the outboard side of said hub to transmit driving action directly to said spider.

10. In combination, a wheel hub having a brake drum supporting portion at its inboard side, bearings in said hub, a driving spindle on said bearings extending through said hub, annular seating means on said hub, a wheel spider having means engaging said seating means for concentrically locating said spider on said hub, said spider having radially extending hollow spokes provided with means for mounting a tire rim on the outer ends thereof, said spokes at their inner ends merging into an annular portion embracing said hub, means for directly transmitting braking reactions to said spider at the inboard side of said spider, and independent means directly connecting said spider to said driving spindle axially outwardly of said hub.

11. A vehicle wheel including a hub presenting an annular seating surface adjacent its inner end and an annular seat of smaller diameter adjacent the outboard end, internal bearing seats disposed in said hub radially inwardly of said annular seat, a wheel spider having axially spaced annular seating surfaces engaging the seating surfaces of said hub to mount said spider concentrically on said hub and having a radially inwardly extending flange engaging the end face of said hub, said first-named seating surface terminating in a radially extending brake drum supporting portion, and a drive spindle extending through said hub and having direct driving connection to said spider flange and to said end face of said hub.

12. A combination wheel hub and brake drum comprising a tubular hub portion, a radially extending flange portion and an axially extending braking portion at the inboard end of said hub all formed as an integral one-piece fabrication, annular axial and radial abutment surfaces on said flange portion, and on the outboard end of said hub, and spaced bearing seat portions disposed within said hub in substantial radial alignment with said abutment surfaces.

13. A combination wheel hub and brake drum comprising a tubular hub portion, a radially extending flange portion at one end of said hub portion terminating in an axially extending braking portion all formed as an integral one-piece fabrication, said flange portion having an annular seating surface spaced radially from said hub portion, and a radial abutment surface on said flange portion extending radially outwardly from one end of said seating surface, and an annular seating surface at the opposite end of said hub portion terminating in a radially inwardly extending face.

14. A combination wheel hub and brake drum comprising a tubular hub portion, a radially extending flange portion and an axially extending braking portion all formed as an integral one-piece fabrication, said flange portion having annular radial and axially extending abutment surfaces intermediate said hub portion and said brake portion, a second annular seating surface about one end of said hub portion terminating in a radial end face on said hub portion, and internal spaced bearing seats in said hub portion between the planes of said radial seating surface on said flange portion and said end face.

FREDERICK W. BURGER.